United States Patent
Lee et al.

(10) Patent No.: US 11,960,866 B2
(45) Date of Patent: Apr. 16, 2024

(54) METHOD AND SYSTEM FOR CONSTRUCTING COMPILER INTERMEDIATE REPRESENTATIONS FROM TENSORFLOW GRAPH

(71) Applicant: Huawei Technologies Co., Ltd., Shenzhen (CN)

(72) Inventors: Jack Lee, Vancouver (CA); Kai-Ting Amy Wang, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 17/650,592

(22) Filed: Feb. 10, 2022

(65) Prior Publication Data
US 2022/0164169 A1 May 26, 2022

Related U.S. Application Data (63) Continuation of application No. PCT/CN2019/120116, filed on Nov. 22, 2019.

(51) Int. Cl.
*G06F 8/40* (2018.01)
*G06F 8/41* (2018.01)

(52) U.S. Cl.
CPC ...................... *G06F 8/41* (2013.01)

(58) Field of Classification Search
CPC ............ G06F 8/41; G06F 8/443; G06F 8/452; G06N 5/00; G06N 3/086; G06N 5/025; G06N 3/082
See application file for complete search history.

(56) References Cited

U.S. PATENT DOCUMENTS

| | | | |
|---|---|---|---|
| 2016/0170725 A1* | 6/2016 | Holton | G06F 8/451 |
| | | | 717/157 |
| 2018/0136912 A1 | 5/2018 | Venkataramani et al. | |
| 2018/0357552 A1 | 12/2018 | Campos et al. | |
| 2019/0012155 A1* | 1/2019 | Oey | G06F 8/443 |
| 2019/0205745 A1 | 7/2019 | Sridharan et al. | |
| 2021/0382702 A1* | 12/2021 | Canas Ferreira | G06F 8/433 |

OTHER PUBLICATIONS

M. Wytock, S. Diamond, F. Heide and S. Boyd, "A New Architecture for Optimization Modeling Frameworks," 2016 6th Workshop on Python for High-Performance and Scientific Computing (PyHPC), Salt Lake City, UT, USA, 2016, pp. 36-44, doi: 10.1109/PyHPC.2016.009. (Year: 2016).*

Kanit Wongsuphasawat et al., "Visualizing Dataflow Graphs of Deep Learning Models in TensorFlow," 2018, School of Computer Science & Engineering, University of Washington, pp. 1-12. Retrieved from the Internet: <URL: https://idl.cs.washington.edu/files/2018-TensorFlowGraph-VAST.pdf>. (Year: 2018).*

* cited by examiner

*Primary Examiner* — Hanh Thi-Minh Bui
(74) *Attorney, Agent, or Firm* — Slater Matsil, LLP (57) ABSTRACT

A method and system are provided to construct, from a TensorFlow graph, a common intermediate representation that can be converted to a plurality of compiler intermediate representations (IRs), which enables compiler optimization to be applied efficiently.

19 Claims, 8 Drawing Sheets

METHOD AND SYSTEM FOR CONSTRUCTING COMPILER INTERMEDIATE REPRESENTATIONS FROM TENSORFLOW GRAPH

CROSS-REFERENCE TO RELATED APPLICATIONS

This application is a continuation of PCT Application No. PCT/CN2019/120116, filed on Nov. 22, 2019 and entitled "Method and System for Constructing Compiler Intermediate Representations from Tensorflow Graph," which is hereby incorporated by reference herein as if reproduced in its entirety.

TECHNICAL FIELD

The present disclosure relates to a method and system for constructing a common intermediate representation from a TensorFlow graph that can be converted to a plurality of compiler intermediate representations.

BACKGROUND

TensorFlow is a machine learning platform that provides inference those models. TensorFlow represents a machine learning model inference those models. TensorFlow represents a machine learning model as a directed graph (referred to as a TensorFlow graph), which includes nodes and edges. Nodes are operators such as Multiply, Add, Divide, and edges indicate data or control dependencies. Control flows such as loops and branches are not explicitly labeled in a TensorFlow graph; instead, they are implicitly represented by a collection of control flow primitives including Switch, Merge, Next Iteration and etc. These control flow primitives are within the TensorFlow graph as nodes and evaluated individually and dynamically to produce high-level control flow behaviors 20 such as loops and branches. Hence, static analysis and compiler optimizations cannot be efficiently applied at the granularity of loops and branches on a TensorFlow graph.

SUMMARY

The present disclosure generally relates to a method and 25 system for constructing a common intermediate representation that can be converted to a plurality of compiler intermediate representations (IRs) from a TensorFlow graph. The constructed common IR can be converted into an equivalent compiler intermediate representation to which compiler static analyses and optimizations, including but not limited to, dominance frontier analysis, common subexpression elimination, loop invariant code motion, and dead code elimination can be applied in linear time.

According to an aspect of the present disclosure, a method is provided that includes: receiving a TensorFlow graph including one or more control flows; processing the TensorFlow graph to extract control flows from the TensorFlow graph and storing the extracted control flows in an extracted control flows data structure; and applying a recursive trace algorithm on the outputs of the TensorFlow graph to construct a common intermediate representation that expresses hierarchical control flows.

In accordance with the preceding aspect, applying the recursive trace algorithm comprises: using the output of the TensorFlow graph as a current node; responsive to determining that the current node is not a terminal node and the current node is not a traversed node: adding the current node to a traversed data structure indicating that the current node has been traversed; responsive to determining that the current node is contained within one of the control flows of the plurality of control flows within the extracted control flows data structure: applying the trace algorithm to inputs of the control flow that contain the current node; and adding the control flow that contains the current node to the traced data structure; responsive to determining that the current node is not contained within one of the control flows of the plurality of control flows within the extracted control flows data structure: applying the trace algorithm recursively to the input of the current node; adding the current node to the traced data structure; outputting the traced data structure, wherein the traced data structure is a list containing TensorFlow graph nodes and common intermediate representation control flows.

In accordance with any of the preceding aspects, the method further includes: constructing, from the common intermediate representation, at least one compiler intermediate representation.

In accordance with any of the preceding aspects, the control flows include a plurality of TensorFlow graph branches in which data follows one of two branch paths that terminates at a Merge node, and the control flows include a plurality of Loop Condition nodes, wherein each Loop Condition node corresponds to a TensorFlow graph loop.

In accordance with any of the preceding aspects, processing the TensorFlow graph to extract control flows from the TensorFlow graph further comprises storing the Merge nodes of each of the plurality of TensorFlow graph branches and the plurality of Loop Condition nodes in the collected nodes data structure.

In accordance with the preceding aspect, the method further includes: (a) determining whether the collected nodes data structure is empty; (b) responsive to determining that the collected nodes data structure is not empty, selecting a node from the collected nodes data structure in an order that guarantees all nodes are selected once before any node is selected a second time; (c) responsive to determining that the selected node is a Merge node: (i) extracting a corresponding TensorFlow graph branch; (ii) responsive to determining that the TensorFlow graph branch is valid: constructing a common intermediate representation branch corresponding to the TensorFlow graph branch; storing the common intermediate representation branch in the extracted control flow data structure; and removing the Merge node from the collected nodes data structure; returning (a); (iii) responsive to determining that the TensorFlow graph branch is not valid, returning to (a); (d) responsive to determining that the selected node is a Loop condition node: (i) extracting the corresponding TensorFlow graph loop predicate and bodies; (ii) responsive to determining that the TensorFlow graph loop predicate and bodies is valid: constructing a common intermediate representation loop corresponding the TensorFlow graph loop; storing the common intermediate representation loop in the extracted control flows data structure; removing the Loop condition node from the collected nodes data structure; returning to (a); (iv) responsive to determining that the TensorFlow graph loop predicate and bodies are not valid, returning to (a).

In accordance with the preceding aspect, extracting a corresponding TensorFlow graph branch comprises: identifying input nodes of the Merge node by traversing the input edges of the Merge node; applying a trace algorithm recursively on the input nodes of the Merge node until a branch exit condition is reached and outputting two branch paths representing the TensorFlow graph branch.

In accordance with the preceding aspect, the branch exit condition is reached when the trace algorithm reaches an Enter node, an Exit node, another Merge node, or a Loop Condition node.

In accordance with the preceding aspect, applying a trace algorithm comprises: using an input of the Merge node as the current node; responsive to determining that the current node is not a terminal node and the current node is not a traversed node, and the branch exit condition is not met: adding the current node to the traversed data structure indicating that the current node has been traversed; responsive to determining that the current node is contained within one of the control flows of the plurality of control flows within the extracted control flows data structure: applying the trace algorithm to inputs of the control flow that contains the current node; and adding the control flow that contains the current node to the traced data structure; responsive to determining that the current node is not contained within one of the control flows of the plurality of control flows within the extracted control flows data structure: applying the trace algorithm to the input of the current node; and adding the current node to the traced data structure; outputting the traced data structure, wherein the traced data structure is a list containing TensorFlow graph nodes and common intermediate representation control flows.

In accordance with a preceding aspect, determining whether the two branch paths representing the TensorFlow graph branch are valid, comprises determining that the two branch paths satisfy all of the following conditions: the two branch paths do not include any Merge nodes; the two branch paths do not include any extracted branches that are part of a TensorFlow graph loop; and the two branch paths outputted by the trace algorithm terminate at the same Merge node, or at least one branch path is terminated at a terminal node.

In accordance with any of the preceding aspects, the method includes: removing all forwarding nodes contained within the two branch paths; responsive to determining that a first branch path of the two branch paths terminates at a Switch node that is contained within a second branch path of the two branch paths: slicing the second branch path into a first slice and a second slice, wherein the first slide includes the Switch node and nodes preceding the Switch node, and the second slice contains nodes succeeding the Switch node, and replacing the second branch path with the second slice and discarding the first slice; and storing the constructed common intermediate representation branch corresponding to the TensorFlow graph branch in the extracted control flows data structure, wherein the common intermediate representation branch includes a branch predicate and the two branch paths, wherein the branch predicate is the first input to the Switch node; responsive to determining that a first branch path of the two branch paths does not terminate at a Switch node or terminating at a Switch node that is not contained within a second branch path of the two branch paths: storing the constructed common intermediate representation branch corresponding to the TensorFlow graph branch in the extracted control flows data structure, wherein the common intermediate representation branch includes an empty branch predicate the two branch paths.

In accordance with any of the preceding aspects, extracting a corresponding TensorFlow graph loop comprises: applying a trace algorithm recursively on the input nodes of the Loop Condition node until a loop exit condition is reached; when the loop exit condition is reached, outputting a loop predicate for the TensorFlow graph loop; applying the recursive trace algorithm on the output nodes of the Loop Condition node until the loop exit condition is reached; when the loop exit condition is reached, outputting loop bodies for the TensorFlow graph loop.

In accordance with any of the preceding aspects, the loop exit condition is reached when the trace algorithm reaches an Enter node, an Exit node, or another Loop Condition node.

In accordance with any of the preceding aspects, applying the trace algorithm recursively comprises: using an input of the Loop condition node as the current node; responsive to determining the current node is not a terminal node and the current node is not a traversed node, and the loop exit condition is not met: adding the current node to the traversed data structure indicating that the current node has been traversed; responsive to determining that the current node is contained within one of the control flows of the plurality of control flows within the extracted control flows data structure: applying the trace algorithm to inputs of the control flow that contains the current node; and adding the control flow that contains the current node to the traced data structure; responsive to determining that the current node is not contained within one of the control flows of the plurality of control flow within the extracted control flows data structure: applying the trace algorithm to the input of the current node; and adding the current node to the traced data structure; outputting the traced data structure, wherein the traced data structure is a list containing TensorFlow graph nodes and common intermediate representation control flow.

In accordance with any of the preceding aspects, applying a trace algorithm comprises: using an output of the Loop condition node as the current node; responsive to determining the current node is not a terminal node and the current node is not a traversed node, and the loop exit condition is not met: adding the current node to the traversed data structure indicating that the current node has been traversed; responsive to determining the current node is contained within one of the control flows of the plurality of control flows within the extracted control flows data structure; applying the trace algorithm to inputs of the control flow that contains the current node; and adding the control flow that contains the current node to the traced data structure; responsive to determining that the current node is not contained within one of the control flows of the plurality of control flow within the extracted control flows data structure: applying the trace algorithm to the input of the current node; and adding the current node to the traced data structure; outputting the traced data structure, wherein the traced data structure is a list containing TensorFlow graph nodes and common intermediate representation control flows.

In accordance with any of the preceding aspects, determining whether the TensorFlow graph loop is valid based on the loop predicate and loop bodies comprises determining that the loop predicate and loop bodies satisfy all of the following conditions: the TensorFlow graph loop predicate and loop bodies do not include any Loop Condition nodes; and the TensorFlow graph loop predicate and loop bodies do not include a Merge node that is not part of an extracted branch.

In accordance with any of the preceding aspects, the method includes: removing all forwarding nodes contained within the loop predicate and loop bodies; for each respective nested common intermediate representation branch within the loop predicate and the loop bodies: responsive to determining that the respective nested common intermediate representation branch has an empty branch predicate: transferring all nodes within the common intermediate representation branch into the loop predicate or the loop bodies containing the branch and remove the common intermediate representation branch from the loop predicate or loop bodies; and storing the constructed common intermediate representation loop corresponding to the TensorFlow graph loop in the extracted control flows data structure, wherein the common intermediate representation loop is an object comprising the loop predicate and the loop bodies.

According to an aspect of the present disclosure, there is provided a non-transitory computer-readable medium storing computer-readable instructions which, when executed by a processor of a processing system, cause the processing system to: receive a TensorFlow graph including one or more control flows; process the TensorFlow graph to extract control flows from the TensorFlow graph; store the extracted control flows in an extract control flow data structure; and apply a recursive trace algorithm, utilizing the extracted control flows data structure, on the outputs of the TensorFlow graph which to construct a common intermediate representation that expresses hierarchical control flows.

In accordance with the preceding aspect, the computer-readable medium stores further computer-readable instructions, which when executed by a processor of a processing system, cause the processing system to construct, from the constructed common intermediate representation, at least one compiler intermediate representation.

According to an aspect of the present disclosure, there is provided a processing system comprising: a processor; a memory storing computer-readable instructions which, when executed by the processor cause, the processing system to: receive a TensorFlow graph including one or more control flows; process the TensorFlow graph to extract control flows from the TensorFlow graph; store the extracted control flows in an extract control flow data structure; and apply a recursive trace algorithm, utilizing the extracted control flows data structure, on the outputs of the TensorFlow graph which to construct a common intermediate representation that expresses hierarchical control flows.

BRIEF DESCRIPTION OF THE DRAWINGS

Some implementations of the present disclosure are described with respect to the following figures.

DETAILED DESCRIPTION OF ILLUSTRATIVE EMBODIMENTS

Throughout the drawings, identical reference numbers designate similar, but not necessarily identical, eleme nts. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Throughout the drawings, the term "intermediate representation" is abbreviated to "IR."

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the present disclosure, a TensorFlow graph is a directed graph that has nodes representing computations or operations and edges representing data or control dependencies. Each node in the directed graph receives inputs, performs an operation on the input data to generate outputs that could serve as inputs of another operation.

In the present disclosure, an intermediate representation (IR) refers to data structures organized to represent a source program constructed using a programming language or an intermediate representation builder interface.

In the present disclosure, a compiler intermediate representation (compiler IR) refers to intermediate representation designs utilized by ahead-of-time compiler infrastructures such as a low level virtual machine (LLVM) and GNU Compiler Collection (GCC). Examples of compiler intermediate representations include any or some combination of the following: Static Single Assignment (SSA), Administrative Normal Form (ANF), Continuation Passing Style (CPS), and so forth. These compiler intermediate representations are pairwise translatable into each other using known conversion algorithms. In other words, each of the above-noted compiler intermediate representations can be translated into any other one of the above-noted compiler intermediate representations, and vice versa.

In the present disclosure, recursion refers to a method of solving a problem where the solution depends on solutions to smaller instances of the same problem. A recursive algorithm refers to an algorithm that invokes itself with smaller or simpler inputs until a base case is reached.

In the present disclosure, a terminal node refers to a TensorFlow graph node without any inputs. Typically, terminal nodes are TensorFlow graph nodes of the types Constant and Placeholder.

In the present disclosure, a forwarding node refers to a TensorFlow control flow primitive, which forwards one of its input to its output nodes. Typically, forwarding nodes are TensorFlow graph nodes of the types Switch, Enter, Exit, and Next Iteration, excluding Merge nodes.

Figure 3:
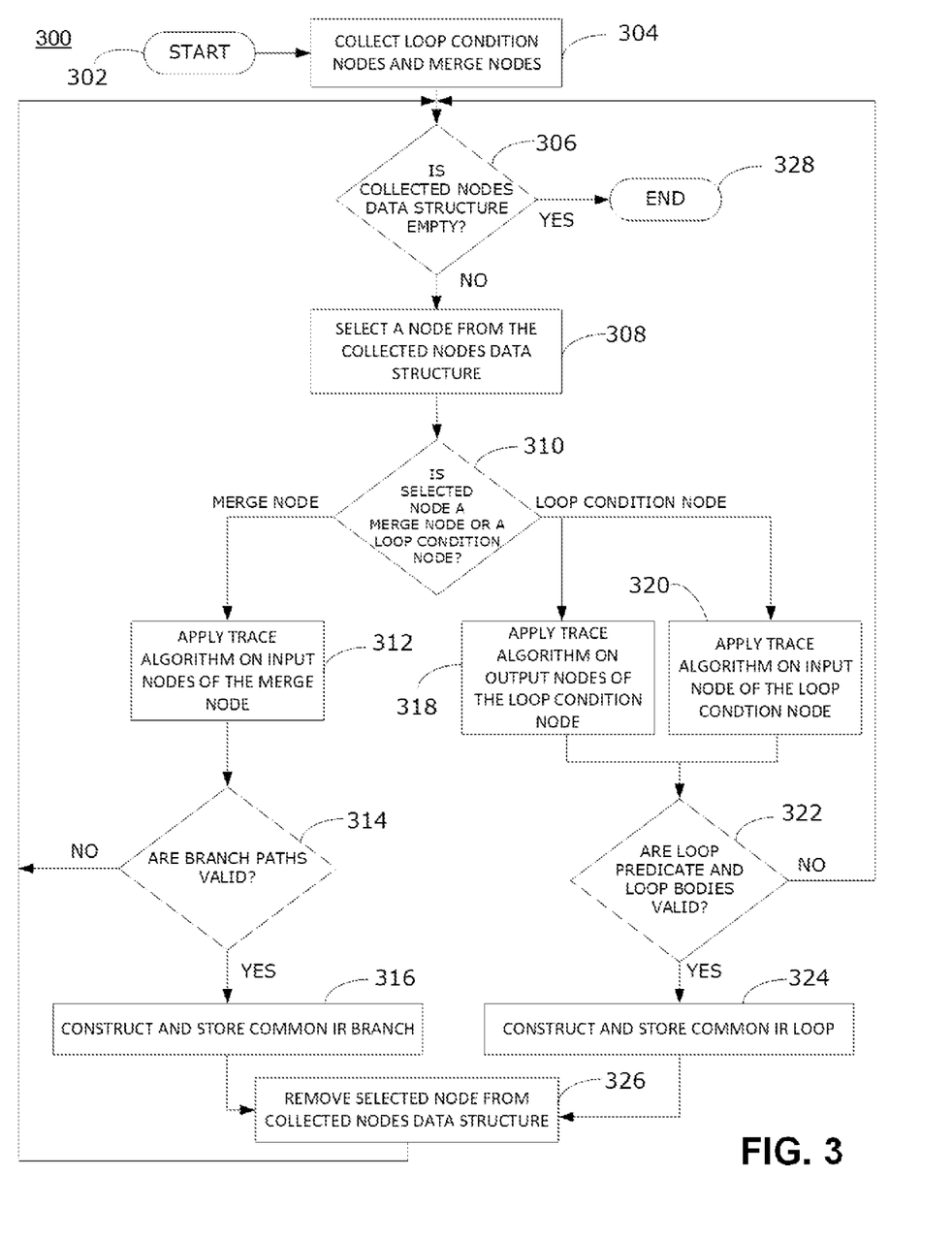
FIG. 3 is a flowchart of a method for extracting control flows from a TensorFlow graph in accordance with an example embodiment of the present disclosure.

In the present disclosure, the collected nodes data structure is shared by all instances of the method 300 (see FIG. 3). The collected data structure is unordered and contains Merge and Loop Condition nodes within a TensorFlow graph. The collected nodes data structure is associated with operations, including adding a new TensorFlow graph node, removing an existing TensorFlow graph node, selecting an existing TensorFlow graph node, and checking whether the collected nodes data structure is empty.

In the present disclosure, the extracted control flows data structure is shared by all instances of the method 300 (see FIG. 3) and the trace process 400 (see FIG. 4) described in further detail below. The extracted control flows data structure is unordered and contains constructed common intermediate representation branches and loops. The extracted control flows data structure is associated with operations, including adding a new common intermediate representation branch or loop and enumerating existing common intermediate representation branches and loops.

Figure 4:
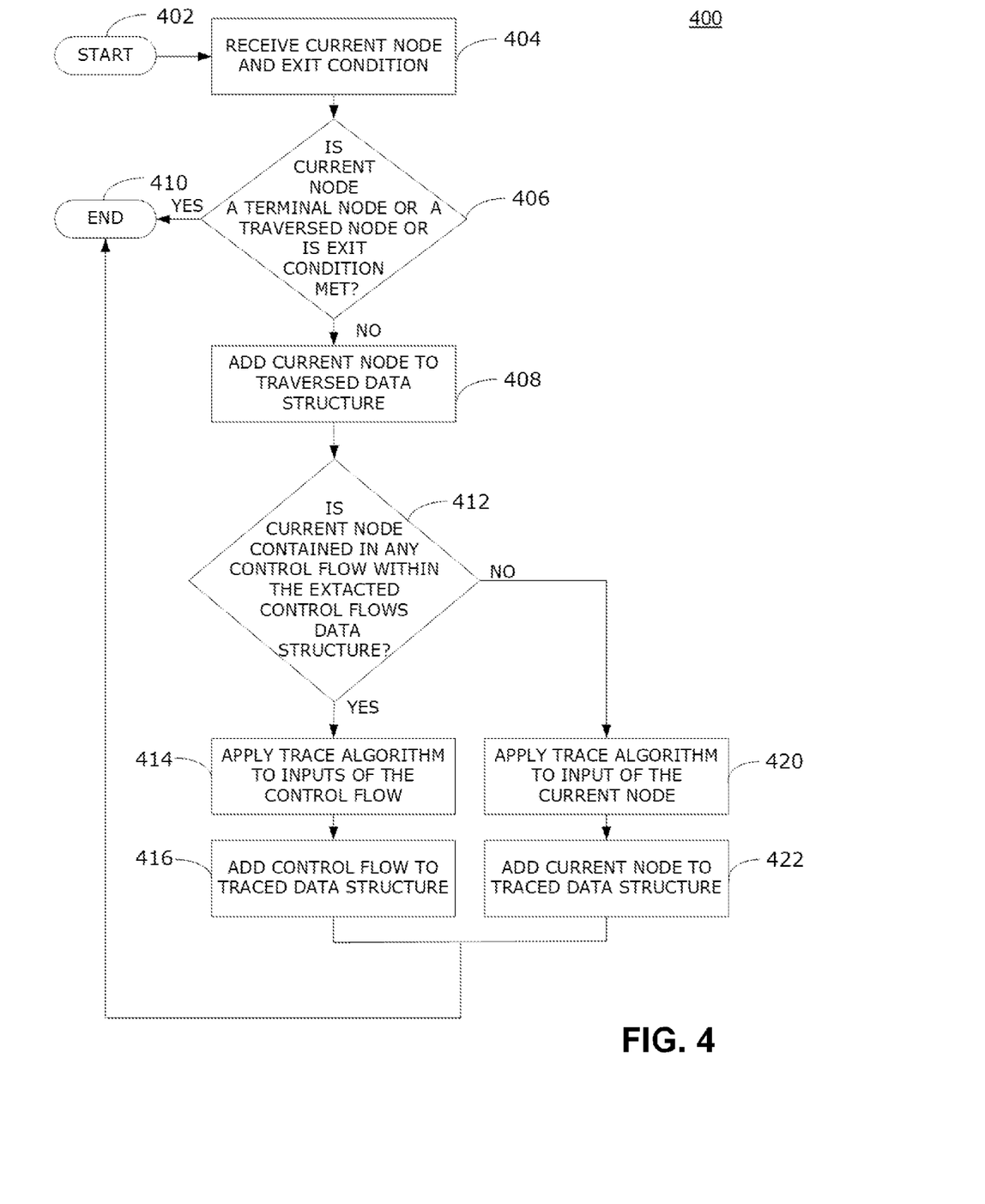
FIG. 4 is a flowchart of a trace algorithm executed by the common intermediate representation generator and control flow extractor of FIG. 1 in accordance with an example embodiment of the present disclosure.

In the present disclosure, the traversed data structure is shared by instances of the trace process 400 (see FIG. 4) stemming from the same recursive call. The traversed data structure is unordered and contains TensorFlow graph nodes traversed by instances of the trace process 400 (FIG. 4). The traversed data structure is associated with operations, including adding a TensorFlow graph node and checking whether a TensorFlow graph node exists within the data structure.

In the present disclosure, the traced data structure is shared by instances of the trace algorithm 400 (see FIG. 4) stemming from the same recursive call. The traced data structure is ordered and contains TensorFlow graph nodes recorded by instances of the trace algorithm. The data structure is associated with operations, including appending a TensorFlow graph node to the end of the data structure, enumerating existing TensorFlow graph nodes, and slicing the data structure at a given TensorFlow graph node. The slicing operation slices the data structure at a given TensorFlow graph node and obtain two slices with the first slice containing the given TensorFlow graph node and nodes preceding it and the second slice containing nodes succeeding the given TensorFlow graph node.

The present disclosure generally relates to a method and a system for constructing a common intermediate representation that can be converted to any compiler intermediate representation from a TensorFlow graph.

Figure 1:
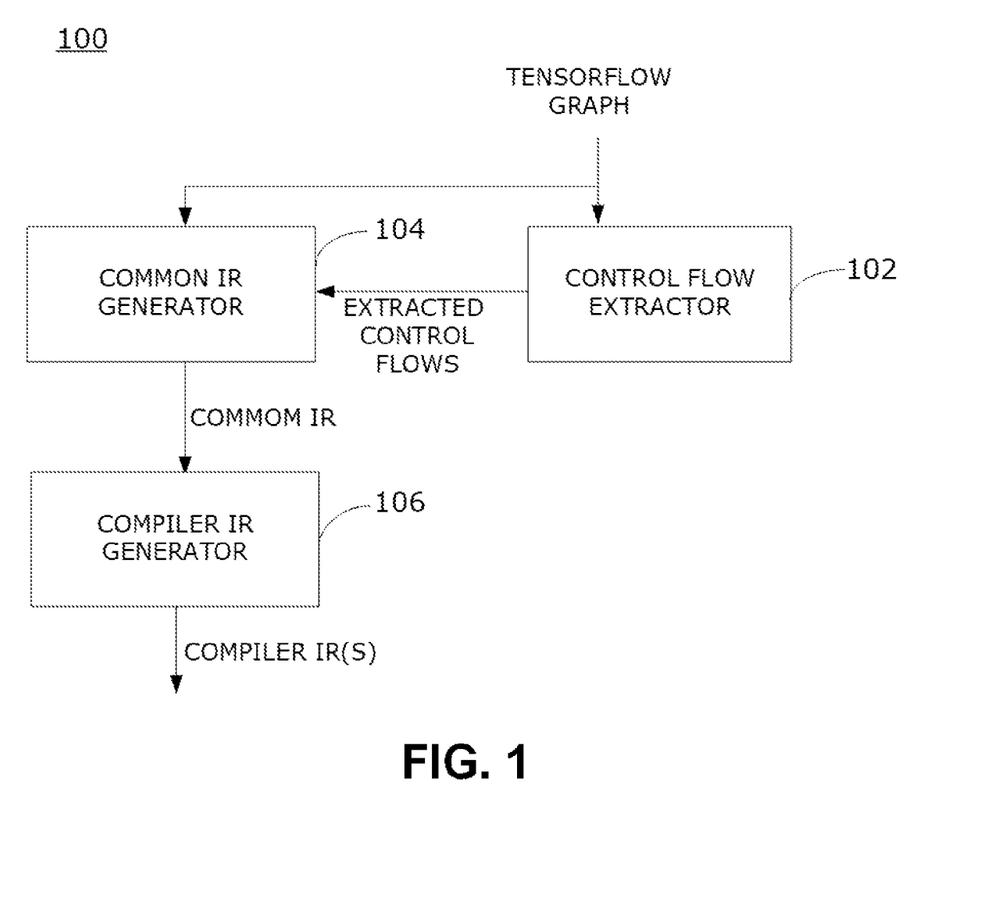
FIG. 1 is a block diagram of a system for generating a compiler intermediate representation from a TensorFlow graph in accordance with an example embodiment of the present disclosure.

FIG. 1 illustrates a block diagram of a system that constructs one or more compiler intermediate representations from a TensorFlow graph. The system 100 includes several software modules or subsystems, including a control flow extractor 102, a common intermediate representation generator 104 operably coupled to the control flow extractor 102, and a compiler intermediate representation generator 106 operably coupled to the common intermediate representation generator 104. The control flow extractor 102 receives a TensorFlow graph, processes the TensorFlow graph to extract control flows from the TensorFlow graph, and outputs the extracted control flows data structure. The common intermediate representation generator 104 receives the TensorFlow graph, and the extracted control flows data structure from the control flow extractor 102 and applies a recursive trace algorithm, utilizing the extracted control flows data structure, on the outputs of the TensorFlow graph to construct a common intermediate representation that explicitly expresses hierarchical control flows. The compiler intermediate representation generator 106 receives the constructed common intermediate representation and constructs one or more compiler intermediate representations from the common intermediate representation, as described in further detail below.

The common intermediate representation constructed by the common intermediate representation generator 104 can be in a form that can be translatable into any of the various different compiler intermediate representations.

Figure 2:
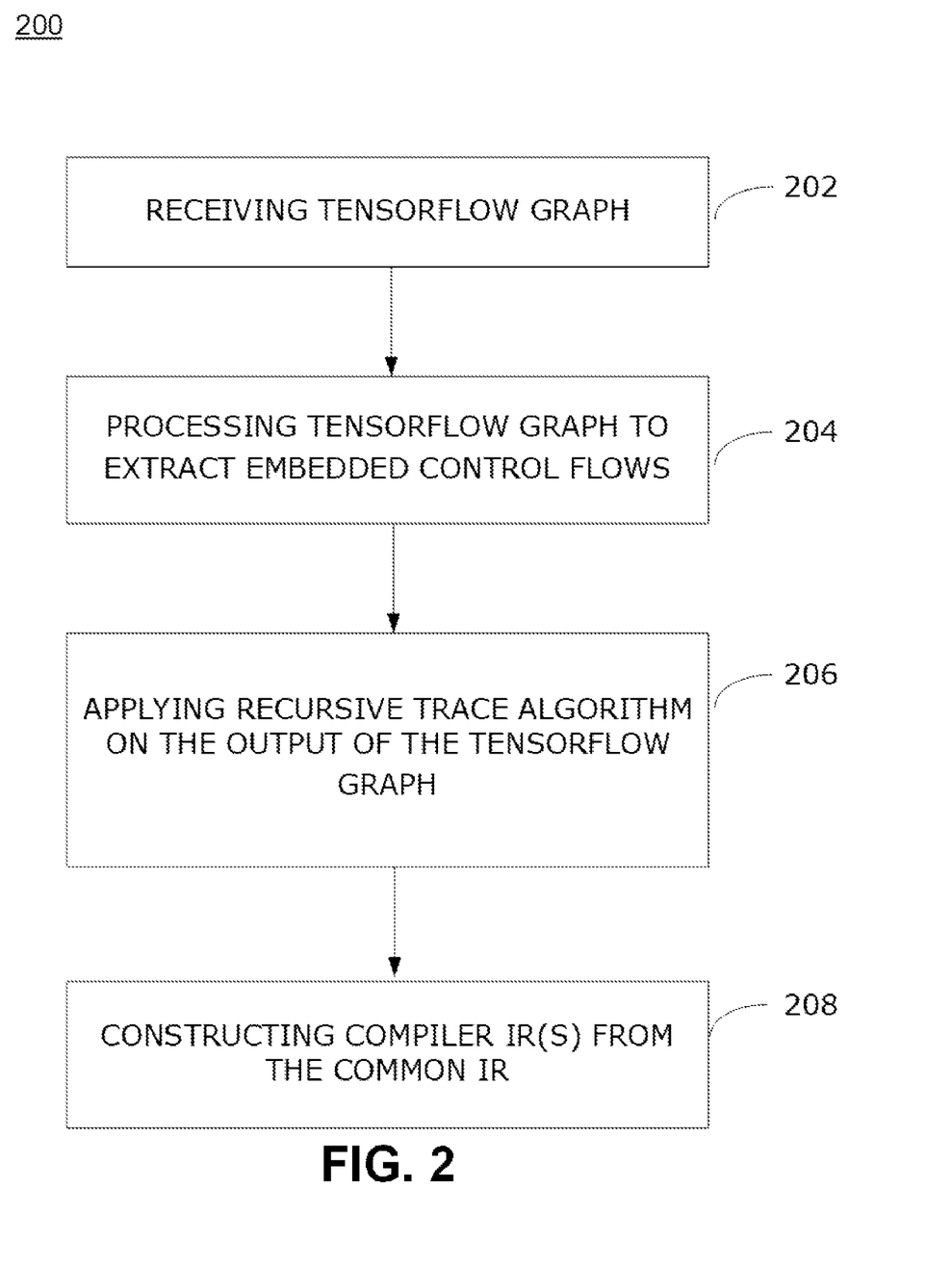
FIG. 2 is a flowchart of the method for constructing a common intermediate representation from a TensorFlow graph in accordance with an example embodiment of the present disclosure.

Referring to FIG. 2, an example embodiment of a method 200 of constructing one or more compiler intermediate representation from a TensorFlow graph is shown.

Method 200 begins at step 202, where a TensorFlow graph is received. One or more of the nodes and edges of the TensorFlow graph are used to indicate control flows, including loops and branches. The method 200 then proceeds to step 204, where the TensorFlow graph is processed to extract control flows that are in the TensorFlow graph using the method 300 (FIG. 3) as described in further detail below. The method 200 then proceeds to step 206, where a recursive trace process 400 (FIG. 3), utilizing the extracted control flows data structure, is applied to the outputs of the TensorFlow graph to construct a common intermediate representation, and all forwarding nodes are removed from the resulting common intermediate representation. The method 200 then proceeds to step 208, where one or more compiler intermediate representations are constructed from the common intermediate representation.

Referring now to FIG. 3, a method 300 of extracting control flows from a TensorFlow graph in accordance with an embodiment of the present disclosure is described. The method 300 begins at step 304. At step 304, Loop Condition nodes and Merge nodes are collected from the TensorFlow graph. Loop Condition nodes and Merge nodes are collected from the TensorFlow graph by iterating through the nodes in the TensorFlow graph using the TensorFlow Python API, C/C++API, or Protocol Buffer API and checking the operation type field of each node; any loop condition or Merge nodes are then recorded by storing them in the collected nodes data structure. After the Loop Condition nodes and Merge nodes are collected at step 304, the method 300 proceeds to step 306.

At step 306, a determination is made whether the collected nodes data structure is empty. If the collected nodes data structure is empty, the method 300 ends. If the collected nodes data structure is not empty, the method 300 proceeds to step 308.

At step 308, a node is selected from the collected nodes data structure in an order that guarantees all nodes are selected once before any node is selected a second time, and the method 300 proceeds to step 310.

At step 310, a determination is made whether the selected node is a Merge node and whether the selected node is a Loop Condition node. If the selected node is a Merge node, the method 300 proceeds to step 312. If the selected node is Loop Condition node, the method 300 proceeds to step 318 and 320.

At step 312, a trace algorithm 400 (see FIG. 4), with the exit condition met when the current node is an Enter node, Exit node, a Merge node that is not the selected Merge node, or a Loop Condition node, is recursively applied on input nodes of the Merge node to obtain two branch paths. The method then proceeds to step 314.

At step 314, a determination is made whether the branch paths are valid. The two branch paths are determined to be valid if the two branch paths do not include any Merge nodes, the two branch paths do not include any extracted branches that are part of a loop predicate or a loop body, and the two branch paths outputted by the trace algorithm terminate at the same Merge node or at least one branch path is terminated at a terminal node. If the two branch paths determined to be valid at step 314, the method 300 proceeds to step 316. If the two branch paths are determined to be not valid at step 310, the method 300 proceeds back to step 306.

At step 316, all forwarding nodes are removed from the valid branch paths. If a branch path terminates at a Switch node that is contained within the other branch path, slice the other branch path in half where the first slice contains the Switch node and its preceding nodes and the second slice contains nodes succeeding the Switch node; the other branch path is then replaced with the second slice, and the first slice is discarded. A common intermediate representation branch is constructed from the valid branch paths and, if applicable, the branch predicate. If both branches terminate at the same Switch node, the first input of the Switch node is the branch predicate. The constructed common intermediate representation branch is then added to the extracted control flows data structure and the method 300 proceeds to step 326.

At step 318, a recursive trace algorithm 400 (see FIG. 4), with the exit condition met when the current node is an Enter node, Exit node, or a Loop Condition node that is not the selected Loop Condition node, is applied on outputs nodes of the Loop Condition node to obtain the loop bodies, and the method 300 proceeds to step 322.

At step 320, a recursive trace algorithm 400 (see FIG. 4), with the exit condition met when the current node is an Enter node, Exit node, or a Loop Condition node that is not the selected Loop Condition node, is applied on the input node of the Loop Condition node to obtain to the loop predicate, and the method 300 proceeds to step 322.

Step 322 starts after both steps 318 and 320 are completed. At step 322, a determination is made whether the loop predicate and loop bodies are valid. The loop predicate and loop bodies are determined to be valid if the loop predicate and loop bodies do not include any Loop Condition nodes, and the loop predicate and loop bodies do not include a Merge node that is not part of an extracted branch. If the loop predicate and loop bodies are valid are determined to be valid at step 322, the method 300 proceeds to step 324. If the loop predicate and loop bodies are determined to be not valid at step 322, the method 300 proceeds back to step 306.

At step 324, all forwarding nodes are removed from the valid loop predicate and loop bodies; for all nested common intermediate representation branches within the loop predicate and the loop bodies, if the common intermediate representation branch has an empty branch predicate, transfer all nodes within the branch into the loop predicate or the loop bodies containing the branch and remove the common intermediate representation branch from the loop predicate or loop bodies. A common intermediate representation loop is constructed from the valid loop predicate and loop bodies. The constructed common intermediate representation loop is then added to the extracted control flows data structure, and the method 300 proceeds to step 326.

At step 326, the selected node is removed from the collected nodes data structure and the method 300 proceeds back to step 306.

Referring now to FIG. 4, an example embodiment of a trace algorithm 400 executed by the common intermediate representation generator and control flow extractor of FIG. 1 is shown. The trace algorithm starts at step 402 and proceeds to step 404. At 404, a node of the TensorFlow graph and an exit condition is received. The received node is designated as the current node, and the trace algorithm 400 proceeds to step 406.

At step 406, a determination is made whether the current node is a terminal node or a traversed node, or whether an exit condition has been met. If, at step 406, a determination is made that the current node is a terminal node or a traversed node or that an exit condition has been met, the trace algorithm 400 proceeds to step 410, and the trace algorithm 400 ends. Otherwise, if, at step 406, a determination is made that the current node is not a terminal node, not a traversed node and an exit condition has not been met, the trace algorithm 400 proceeds to step 408.

At step 408, the current node is added to the traversed data structure, and the trace algorithm 400 proceeds to step 412. At step 412, a determination is made whether the current node is contained in any control flow within the extracted control flows data structure.

If, at step 412, a determination is made that the current node is contained in any control flow within the extracted control flows data structure, the trace algorithm 400 proceeds to step 414. If, at step 412, a determination is made that the current node is not contained in any control flow within the extracted control flows data structure, the trace algorithm 400 proceeds to step 420.

At step 414, an instance of the trace algorithm 400 is recursively applied to each input of the control flow containing the current node. After all the instances of the trace algorithm 400 are applied to the inputs of the control flow containing the current node, the trace algorithm 400 ends, the trace algorithm 400 proceeds to step 416.

At step 416, the control flow within the extracted control flows data structure containing the current node is added to the traced data structure, and the trace algorithm 400 ends.

At step 420, an instance of the trace algorithm 400 is recursively applied to each input of the current node. After all the instances of the trace algorithm 400 are recursively applied to the inputs of the current node, the trace algorithm 400 ends, and the trace algorithm 400 proceeds to step 422.

At step 422, the current node is added to the traced data structure, and the trace algorithm 400 ends.

Figure 5:
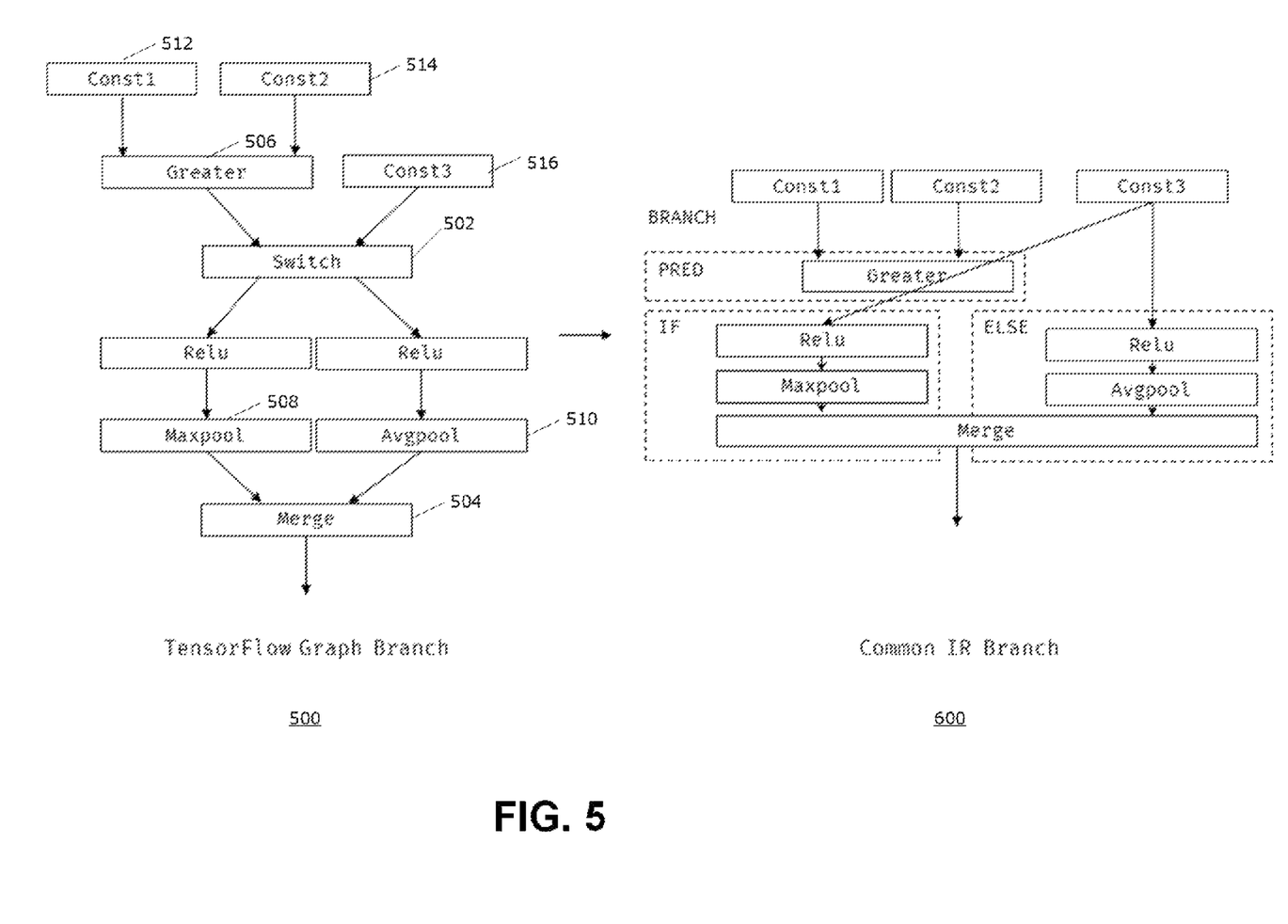
FIG. 5 is an example workflow for extracting a branch from a TensorFlow graph in accordance with the method of FIG. 3.

Referring to FIG. 5, the method 300 of extracting control flows from an example TensorFlow graph 500 containing a branch will be described. The example TensorFlow graph 500 shown in FIG. 5 contains 2 TensorFlow control flow primitives of types Switch and Merge; additionally, FIG. 5 contains 5 TensorFlow operations of types Greater, Relu, Maxpool, and Avgpool.

Applying the method 300 to the example TensorFlow graph 500. At step 304 of the method 300, Merge node 504 is stored into the collected nodes data structure, the method 300 proceeds to step 306.

The method 300 will proceed from step 306 to step 308 as long as Merge node 504 is not yet processed and removed from the collected nodes data structure.

At step 308 of the method 300, Merge node 504 is selected from the collected nodes data structure, and the method 300 proceeds to step 312.

At step 312 of the method 300, an instance of the trace algorithm 400 is recursively applied on each input node of Merge node 504. The instance of the trace algorithm 400 applied to a Maxpool node 508, which is the first input of the Merge node 504, traces until Constant node 512, Constant node 514, and Constant node 516 where terminal nodes are reached. A branch path is obtained from the traced data structure produced at the end of the instance of the trace algorithm 400. The instance of the trace algorithm 400 applied to Avgpool node 510, which is the second input of the Merge node 504, traces until Switch node 502 where the trace ends by reaching a traversed node. A second branch path is obtained from the traced data structure produced at the end of the instance of the trace algorithm 400. The method 300 proceeds to step 314.

At step 314 of the method 300, both branch paths are determined to be valid. The method 300 proceed to step 316.

At step 316 of the method 300, forwarding nodes are removed; in this case, there are none. If a branch path terminates at a Switch node that is contained within the other branch path, slice the other branch path in half where the first slice contains the Switch node and its preceding nodes and the second slice contains nodes succeeding the Switch node; the other branch path is then replaced with the second slice, and the first slice is discarded; in this case, the branch path obtained from tracing the Maxpool node 508 is sliced after the Switch node 502 and replaced by the second slice. A common intermediate representation branch is constructed in the form of branch 600 with Greater node 506—the first input of Switch node 504, which both branch paths terminate at—as the branch predicate. The branch 600 added to the extracted control flows data structure, and the method 300 proceeds to step 326.

At step 326 of the method 300, the Merge node 504 is removed from the collected nodes data structure. The method 300 proceeds back to step 306, where the collected nodes data structure is empty, and the method 300 ends.

Figure 6A:
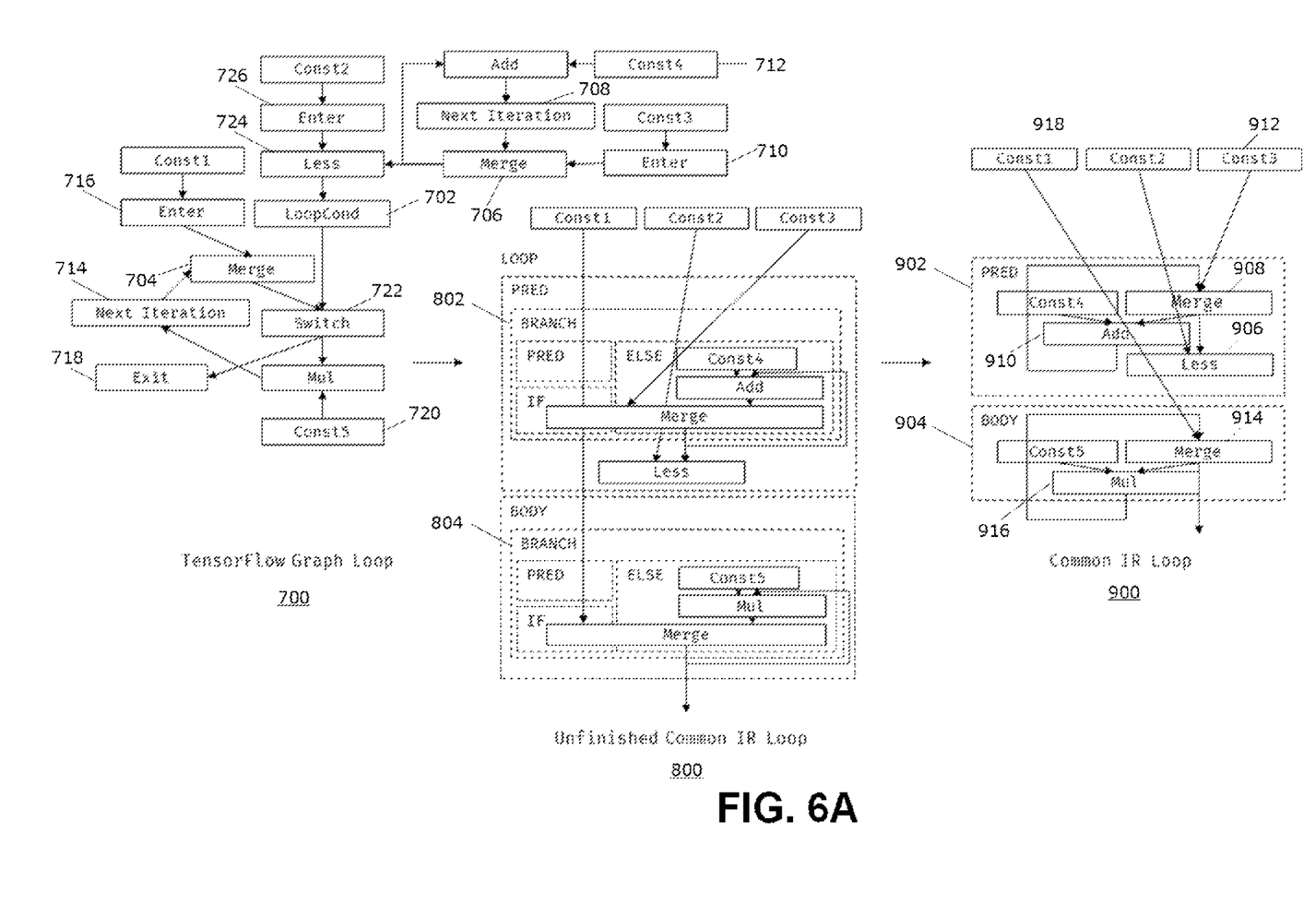
FIGS. 6A and 6B are example workflows for a loop from a TensorFlow graph in accordance with the method of FIG. 3.

Referring to FIG. 6A, the method 300 of extracting control flows from an example TensorFlow graph 700 containing a loop will be described. The example TensorFlow graph 700 shown in FIG. 6A contains 10 TensorFlow control flow primitives of types Enter, Next Iteration, Exit, Loop Condition, Switch, and Merge; additionally, FIG. 6A contains 8 TensorFlow operations of types Constant, Multiply, Add, and Less.

Applying the method 300 to the example TensorFlow graph 700. At step 304 of the method 300, Merge nodes 706, 704, and Loop Condition node 702 is stored into the collected nodes data structure, the method 300 proceeds to step 306.

The method 300 will proceed from step 306 to step 308 as long as any node in Merge nodes 706, 704, and Loop Condition node 702 is not yet processed and removed from the collected nodes data structure.

At step 308 of the method 300, a node is selected from the collected nodes data structure. The following descriptions will describe the scenario when the nodes are selected and processed in the order of Merge node 706, Merge node 704 then Loop Condition node 702. The nodes can be selected in any order that guarantees all nodes are selected once before any node is selected a second time; however, if Loop Condition node 702 is selected before Merge node 706 or 704, the resulting loop predicate and loop body will not be valid since they will include nested Merge nodes 706 and 704; the method 300 will then return to step 306, thus, guaranteeing the nested Merge nodes 706 and 704 will always be processed before Loop Condition node 702.

Merge node 706 is selected and the method 300 proceed to step 310 where the selected node is determined to be a Merge node, the method 300 proceeds to step 312.

At step 312 of the method 300, an instance of the trace algorithm 400 is recursively applied on each input node of Merge node 706. The instance of the trace algorithm 400 applied to Next Iteration node 708, which is the first input of the Merge node 706, traces until Merge node 706 and Constant node 712 where the exit condition is met by reaching the selected Merge node and by reaching a terminal node, respectively. A branch path is obtained from the traced data structure produced at the end of the instance of the trace algorithm 400. The instance of the trace algorithm 400 applied to Enter node 710, which is the second input of the Merge node 706, ends immediately as the exit condition is met upon reaching an Enter node. A second branch path is obtained from the traced data structure produced at the end of the instance of the trace algorithm 400. The method 300 proceeds to step 314.

At step 314 of the method 300, both branch paths are determined to be valid. The method 300 proceed to step 316.

At step 316 of the method 300, forwarding node such as Next Iteration node 708 is removed. A common intermediate representation branch is constructed in the form of branch 802 with an empty branch predicate as the branch paths do not terminate at a Switch node. The branch 802 is added to the extracted control flows data structure, and the method 300 proceeds to step 326.

At step 326 of the method 300, the Merge node 706 is removed from the collected nodes data structure, and the method 300 proceeds back to step 306.

Merge node 704 is selected, and the method 300 proceeds to step 310 where the selected node is determined to be a Merge node, the method 300 proceeds to step 312.

At step 312 of the method 300, an instance of the trace algorithm 400 is recursively applied on each input node of Merge node 704. The instance of the trace algorithm 400 applied to Next Iteration node 714, which is the first input of the Merge node 704, traces until Merge node 704, Loop Condition node 702, Exit node 718, and Constant node 720 where the exit condition is met by reaching the selected Merge node, a Loop Condition node, an Exit node and by reaching a terminal node respectively. A branch path is obtained from the traced data structure produced at the end of the instance of the trace algorithm 400. The instance of the trace algorithm 400 applied to Enter node 716, which is the second input of the Merge node 704, ends immediately as the exit condition is met upon reaching an Enter node. A second branch path is obtained from the traced data structure produced at the end of the instance of the trace algorithm 400. The method 300 proceeds to step 314.

At step 314 of the method 300, both branch paths are determined to be valid. The method 300 proceed to step 316.

At step 316 of the method 300, forwarding node such as Next Iteration node 714 is removed. A common intermediate representation branch is constructed in the form of branch 804 with an empty branch predicate as the branch paths do not terminate at a Switch node. The branch 804 is added to the extracted control flows data structure, and the method 300 proceeds to step 326.

At step 326 of the method 300, the Merge node 704 is removed from the collected nodes data structure, and the method 300 proceeds back to step 306.

Loop Condition node 702 is selected, and the method 300 proceed to step 310 where the selected node is determined to be a Loop Condition node, the method 300 proceeds to step 318 and 320.

At step 318 of the method 300, an instance of the trace algorithm 400 is recursively applied on each output node of Loop Condition node 702. The instance of the trace algorithm 400 applied to Switch node 722, which is the only output of Loop Condition node 702, traces until Enter node 716, Switch node 722, and Loop Condition node 702 where the exit condition is met by reaching an Enter node, a traversed node, and the selected Loop Condition node respectively. The instance of the trace algorithm 400 also encounters the extracted branch 804 and adds the extracted branch 804 to the traced data structure. A loop body is obtained from the traced data structure produced at the end of the instance of the trace algorithm 400. The method 300 proceeds to step 322.

At step 320 of the method 300, an instance of the trace algorithm 400 is recursively applied on the input node of Loop Condition node 702. The instance of the trace algorithm 400 applied to Less node 724, which is the input of Loop Condition node 702, traces until Enter node 726 and Enter node 710, where the exit condition is met by reaching Enter nodes. The instance of the trace algorithm 400 also encounters the extracted branch 802 and adds the extracted branch 802 to the traced data structure. The loop predicate is obtained from traced data structure produced at the end of the instance of the trace algorithm 400. The method 300 proceeds to step 322.

At step 322 of the method 300, the loop predicate and body are determined to be valid. The loop predicate and body are currently in the form of loop 800. The method 300 proceed to step 324.

At step 324 of the method 300, all forwarding nodes are removed from the loop predicate and bodies; in this case, there are none. For all nested common intermediate representation branches 802 and 804 within the loop predicate and the loop bodies, transfer all nodes within the branch into the loop predicate or the loop bodies containing the branch and remove the common intermediate representation branch from the loop predicate or loop bodies if the common intermediate representation branch has an empty branch predicate; in this case, both nested branch 802 and 804 have an empty branch predicate. A common intermediate representation loop is constructed in the form of loop 900. The loop 900 is added to the extracted control flows data structure, and the method 300 proceeds to step 326.

At step 326 of the method 300, the Loop Condition node 702 is removed from the collected nodes data structure. The method 300 proceeds back to step 306 where the collected nodes data structure is empty, and the method 300 ends.

Figure 6B:
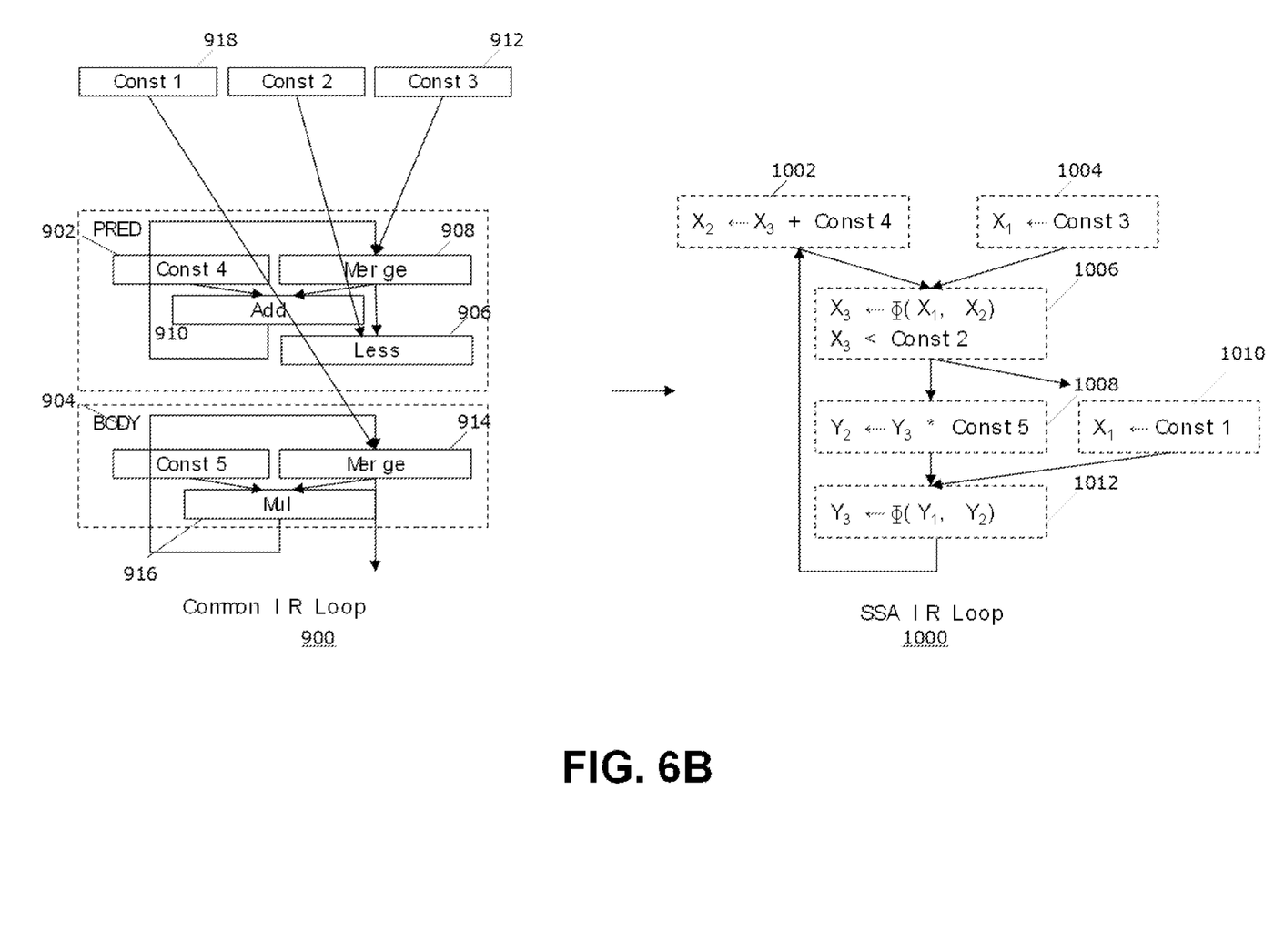

Referring to FIG. 6B, a continuation of FIG. 6A where the example common intermediate representation loop 900 is obtained from applying the method 300 to the example TensorFlow graph 700. The process of converting the common intermediate representation loop 900 to a valid SSA intermediate representation will be described.

A common intermediate representation to SSA trace algorithm is defined. Given a common intermediate representation node, the trace algorithm will recursively traverse the inputs of the given node. The trace algorithm will also take a basic block as an input where a basic block contains a list of instructions and input and output edges connected to other basic blocks, as shown in the example SSA loop 1000. If the given node is not a Merge node, the instruction equivalent to the given node operation is added to the beginning of the given basic block, and the given basic block is given to recursive trace algorithms applied on the inputs of the given node as input. If the given node is a Merge node, an SSA Phi node that is equivalent to the given Merge node is added to the beginning of the given basic block, and 2 new basic blocks are created as inputs to the given basic block; the new basic blocks are given to the corresponding recursive trace algorithms applied on the inputs of the given Merge node as input. If the given node has been previously traversed, add the basic block containing the given node as an input to the given basic block, and the trace algorithm ends. If the given node is a terminal node, the trace algorithm ends.

The conversion from an example common intermediate representation loop 900 to the equivalent SSA intermediate representation 1000 will be described. Applying the common intermediate representation to SSA trace algorithm to Less node 906—the output of loop predicate 902, the basic block 1006 containing equivalent SSA expression to Less node 906 and Merge node 908 is obtained; the basic block 1002 is then obtained from recursively tracing Add node 910—the first input of Merge node 908; the basic block 1004 is then obtained from recursively tracing Constant node 912—the second input of Merge node 908. Applying the common intermediate representation to SSA trace algorithm to Merge node 914—the output of loop body 904, the basic block 1012 is obtained; the basic block 1008 is then obtained from recursively tracing Multiply node 916—the first input of the Merge node 914; the basic block 1010 is then obtained from recursively tracing Constant node 918—the second input of the Merge node 914. Finally, a control edge between basic block 1006—the output block of the loop predicate identified by finding the basic block containing the output node of loop predicate 902—and basic block 1008—the input block of the loop body identified by finding a basic block containing a terminal node within the loop body 904—is added; an output edge indicating the loop exit is added to basic block 1006; a back edge indicating the next iteration between basic block 1012—the output of the loop body identified by finding the basic block containing the output node of loop body 904—and basic block 1002—the input block of the loop predicate identified by finding a basic block containing a terminal node within the loop predicate 906—is added.

Figure 7:
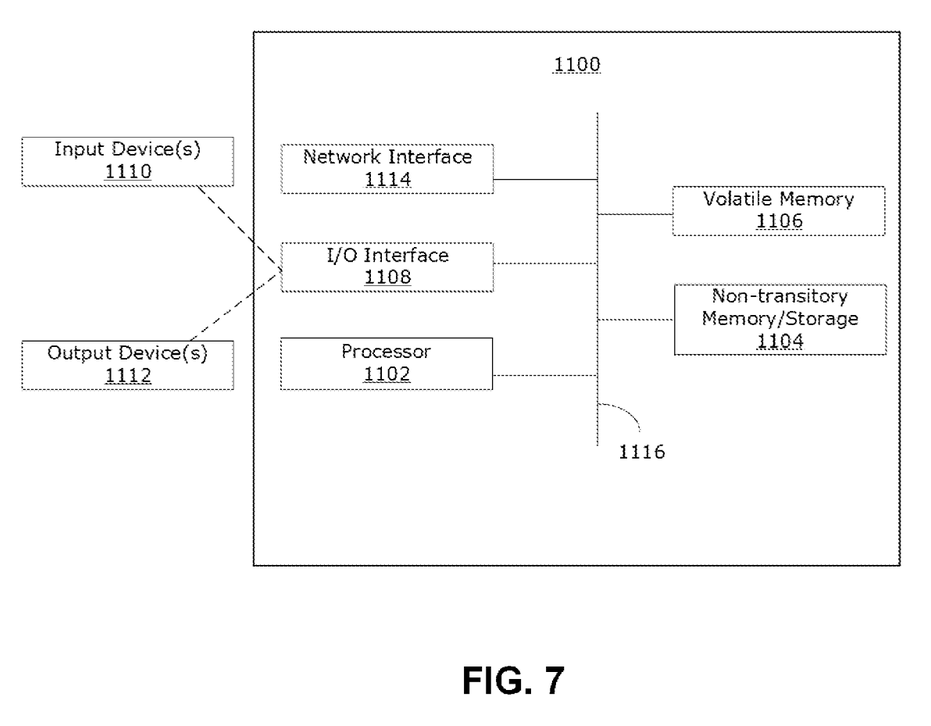
FIG. 7 is a block diagram of an example computer that performs the method of FIG. 2.

FIG. 7 shows a block diagram of an example computing device 1100, which may be used to implement embodiments of the methods disclosed herein. The computing device 1100 includes multiple components, including one or more processors 1102 that controls the overall operation of the computing device 1100. The one or more processors 1102 are coupled to and interact with other components of the computing device 1100, including one or more non-transitory memory/storage units 1104, one or more volatile memory(ies) 1106, one or more input/output (I/O) interfaces 1108 to enable interfacing with one or more optional input devices 1110 and/or output devices 1112, and one or more network interfaces 1114.

The one or more processors 1102 may include a microprocessor, a central processing unit (CPU), a hardware accelerator, an application-specific integrated circuit (ASIC), a field-programmable gate array (FPGA), a dedicated logic circuitry, or combinations thereof.

The one or more non-transitory memory/storage unit(s) 1104 may include a mass storage unit such as a solid-state drive, a hard disk drive, a magnetic disk drive and/or an optical disk drive, and one or more non-volatile memories such as a flash memory, and/or a read-only memory (ROM). The one or more volatile memory(ies) 1106 may include a random access memory (RAM). The non-transitory memory/storage unit(s) 1104 may store software for execution by the processor(s) 1102, such as software that implements the methods 200, 300, and 400 described in the present disclosure as well as other software instructions, such as for implementing an operating system and other applications/functions. The software that implements the methods 200, 300, and 400 includes computer-readable instructions that are executable by the one or more processor(s) 1102. Coding of the software that implements the methods 200, 300, and 400 is within the scope of a person of ordinary skill in the art provided the present disclosure. The methods 200, 300, and 400 may contain additional or fewer steps than shown in FIGS. 2, 3, and 4 and/or described above, and may be performed in a different order. In some examples, instructions stored in non-transitory storage/memory units 1104 may be temporarily loaded into volatile memory(ies) 1106 for execution by processors 1102.

The one or more network interfaces 1114 are for wired or wireless communication with a network (e.g., an intranet, the Internet, a P2P network, a WAN and/or a LAN) or another node. The network interface(s) 206 may include wired links (e.g., Ethernet cable) and/or wireless links (e.g., one or more antennas) for intra-network and/or inter-network communications.

In some examples, one or more data sets and/or modules may be provided by an external memory (e.g., an external drive in wired or wireless communication with the computing device 1100 or may be provided by a transitory or non-transitory computer-readable medium. Examples of non-transitory computer-readable media include a RAM, a ROM, an erasable programmable ROM (EPROM), an electrically erasable programmable ROM (EEPROM), a flash memory, a CD-ROM, or other portable memory storage.

The computing device 1100 also includes a bus 1116 providing communication among components of the computing device 1100, including the processor(s) 1102, optional I/O interface(s) 1108, network interface(s) 1114, non-transitory memory/storage units 1104 and/or the volatile memory(ies) 1106. The bus 1116 may be any suitable bus architecture, including, for example, a memory bus, a peripheral bus or a video bus.

In FIG. 7, the optional input device(s) 1110 (e.g., a keyboard, a mouse, a microphone, a touchscreen integrated into or overlaid on a display device, and/or a keypad) and optional output device(s) 1112 (e.g., a display device, a speaker and/or a printer) are shown as external to the computing device 1100. In other examples, one or more of the input device(s) 1110 and/or the output device(s) 1112 may be an internal component of the computing device 1100. The input device(s) 1110 may include a display device having a display screen and a user interface (UI) navigation input device (for example, a touchscreen, a mouse, a trackpad, voice interface, or other interface device) for allowing a user to interact with items displayed by the display device.

Although a physical computing device 1100 is shown in FIG. 7, it will be appreciated that the embodiments of the methods and system disclosed herein may be implemented on one or more virtual machines instantiated by a cloud service provider or a distributed computing system. Alternatively, the methods and system disclosed herein may be implemented as a service provided by a cloud computing provider.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

Advantageously, the method and system of the present disclosure convert a TensorFlow graph into an equivalent compiler intermediate representation to which compiler static analyses and optimizations, including but not limited to, dominance frontier analysis, common subexpression elimination, loop invariant code motion, and dead code elimination can be applied in linear time. In addition, existing analyses, libraries, algorithms, and techniques applied to compiler intermediate representations can be equivalently applied to a program represented by the TensorFlow graph, thus, lowering engineering costs.

What is claimed is:

1. A method comprising:
   receiving, by a processing system, a TensorFlow graph including one or more control flows;
   processing, by the processing system, the TensorFlow graph to extract control flows from the TensorFlow graph and storing the control flows in an extracted control flows data structure;
   applying, by the processing system, a recursive trace algorithm on outputs of the TensorFlow graph, the applying the recursive trace algorithm comprising recursively utilizing the extracted control flows data structure on the outputs of the TensorFlow graph to construct a common intermediate representation that expresses hierarchical control flows;
   removing, by the processing system, all forwarding nodes contained within a TensorFlow graph loop predicate and loop bodies;
   for each respective nested common intermediate representation branch within the TensorFlow graph loop predicate and the loop bodies, responsive to determining that the respective nested common intermediate representation branch has an empty branch predicate:
      transferring, by the processing system, all nodes within a common intermediate representation branch into TensorFlow graph loop or bodies containing a branch; and
      removing, by the processing system, the common intermediate representation branch from the TensorFlow graph loop predicate or the loop bodies;
   storing, by the processing system, a common intermediate representation loop corresponding to the TensorFlow graph loop in the extracted control flows data structure, wherein the common intermediate representation loop includes the TensorFlow graph loop predicate and the loop bodies; and
   constructing, by the processing system, one or more compiler intermediate representations from the common intermediate representation.

2. The method of claim 1, wherein the applying the recursive trace algorithm comprises:
   using an output of the TensorFlow graph as a current node;
   responsive to determining that the current node is not a terminal node and the current node is not a traversed node, adding the current node to a traversed data structure indicating that the current node has been traversed;
   responsive to determining that the current node is included within one of the control flows of a plurality of control flows within the extracted control flows data structure:
      applying the recursive trace algorithm to inputs of a control flow that contain the current node; and
      adding the control flow that contains the current node to a traced data structure;
   responsive to determining that the current node is not included within one of the control flows of the plurality of control flows within the extracted control flows data structure:
      applying the recursive trace algorithm to an input of the current node; and
      adding the current node to the traced data structure; and
   outputting the traced data structure, wherein the traced data structure is a list containing TensorFlow graph nodes and common intermediate representation control flow objects.

3. The method of claim 1, further comprising:
   constructing, from the common intermediate representation, at least one compiler intermediate representation.

4. The method of claim 1, wherein the control flows include a plurality of TensorFlow graph branches in which data follows one of two branch paths that terminates at a Merge node, wherein the control flows include a plurality of Loop Condition nodes, and wherein each Loop Condition node corresponds to the TensorFlow graph loop.

5. The method of claim 4, wherein the processing the TensorFlow graph to extract control flows from the TensorFlow graph further comprises storing Merge nodes of each of the plurality of TensorFlow graph branches and the plurality of Loop Condition nodes in a collected nodes data structure.

6. The method of claim 5, further comprising:
(a) determining whether the collected nodes data structure is empty;
responsive to determining that the collected nodes data structure is not empty:
selecting a node from the collected nodes data structure in an order that guarantees all nodes are selected once before any node is selected a second time;
responsive to determining that the node is a Merge node, extracting a corresponding TensorFlow graph branch;
responsive to determining that the corresponding TensorFlow graph branch is valid, constructing the common intermediate representation branch corresponding to the corresponding TensorFlow graph branch;
storing the common intermediate representation branch in the extracted control flows data structure;
removing the Merge node from the collected nodes data structure;
returning to (a);
responsive to determining that the corresponding TensorFlow graph branch is not valid, returning to (a);
responsive to determining that the node is a Loop condition node:
extracting a corresponding TensorFlow graph loop predicate and bodies;
responsive to determining that the corresponding TensorFlow graph loop predicate and bodies are valid:
constructing the common intermediate representation loop corresponding the TensorFlow graph loop;
storing the common intermediate representation loop in the extracted control flows data structure;
removing the Loop condition node from the collected nodes data structure;
returning to (a); and
responsive to determining that the corresponding TensorFlow graph loop predicate and bodies are not valid, returning to (a).

7. The method of claim 6, wherein the extracting the corresponding TensorFlow graph branch comprises:
identifying input nodes of the Merge node by traversing input edges of the Merge node; and
applying the recursive trace algorithm on the input nodes of the Merge node until a branch exit condition is reached and outputting two branch paths representing the corresponding TensorFlow graph branch.

8. The method of claim 7, wherein the branch exit condition is reached when the recursive trace algorithm reaches an Enter node, an Exit node, another Merge node, or the Loop Condition node.

9. The method of claim 7, wherein the applying the recursive trace algorithm comprises:
using an input of the Merge node as a current node;
responsive to determining that the current node is not a terminal node and the current node is not a traversed node, and the branch exit condition is not met:
adding the current node to a traversed data structure indicating that the current node has been traversed;
responsive to determining that the current node is contained within one of the control flows of a plurality of control flows within the extracted control flows data structure:
applying the recursive trace algorithm to inputs of a control flow that contains the current node; and
adding the control flow that contains the current node to a traced data structure;
responsive to determining that the current node is not contained within one of the control flows of the plurality of control flows within the extracted control flows data structure:
applying the recursive trace algorithm to the input of the current node; and
adding the current node to the traced data structure; and
outputting the traced data structure, wherein the traced data structure is a list containing TensorFlow graph nodes and common intermediate representation control flow objects.

10. The method of claim 7, wherein the determining whether the two branch paths representing the corresponding TensorFlow graph branch are valid, comprises determining that the two branch paths satisfy following conditions:
the two branch paths do not include any Merge nodes;
the two branch paths do not include any extracted branches that are part of the TensorFlow graph loop; and
the two branch paths outputted by the recursive trace algorithm terminate at a same Merge node, or at least one branch path is terminated at a terminal node.

11. The method of claim 7, further comprising:
removing all forwarding nodes contained within the two branch paths;
responsive to determining that a first branch path of the two branch paths terminates at a Switch node that is contained within a second branch path of the two branch paths, slicing the second branch path into a first slice and a second slice, wherein the first slice includes the Switch node and nodes preceding the Switch node, and the second slice contains nodes succeeding the Switch node, and replacing the second branch path with the second slice and discarding the first slice; and
storing the common intermediate representation branch in the extracted control flows data structure, wherein the common intermediate representation branch includes a branch predicate and the two branch paths, wherein the branch predicate is a first input to the Switch node if both the first branch path and the second branch path terminate at the Switch node.

12. The method of claim 6, wherein the extracting the corresponding TensorFlow graph loop predicate and bodies comprises:
applying the recursive trace algorithm on input nodes of the Loop Condition node until a loop exit condition is reached;
when the loop exit condition is reached, outputting a loop predicate for the TensorFlow graph loop;
applying the recursive trace algorithm on output nodes of the Loop Condition node until the loop exit condition is reached; and
when the loop exit condition is reached, outputting loop bodies for the TensorFlow graph loop.

13. The method of claim 12, wherein the loop exit condition is reached when the recursive trace algorithm reaches an Enter node, an Exit node, or another Loop Condition node.

14. The method of claim 12, wherein the applying the recursive trace algorithm comprises:
   using an input of the Loop condition node as a current node;
   responsive to determining the current node is not a terminal node and the current node is not a traversed node, and the loop exit condition is not met:
      adding the current node to a traversed data structure indicating that the current node has been traversed;
   responsive to determining that the current node is contained within one of the control flows of a plurality of control flows within the extracted control flows data structure:
      applying the recursive trace algorithm to inputs of a control flow that contains the current node; and
      adding the control flow that contains the current node to a traced data structure;
   responsive to determining that the current node is not contained within one of the control flows of the plurality of control flows within the extracted control flows data structure:
      applying the recursive trace algorithm to the input of the current node; and
      adding the current node to the traced data structure; and
   outputting the traced data structure, wherein the traced data structure is a list containing TensorFlow graph nodes and common intermediate representation control flow objects.

15. The method of claim 12, wherein applying the recursive trace algorithm comprises:
   using an output of the Loop condition node as a current node;
   responsive to determining the current node is not a terminal node and the current node is not a traversed node, and the loop exit condition is not met, adding the current node to a traversed data structure indicating that the current node has been traversed;
   responsive to determining the current node is contained within one of the control flows of a plurality of control flows within the extracted control flows data structure:
      applying the recursive trace algorithm to inputs of a control flow that contains the current node; and
      adding the control flow that contains the current node to a traced data structure;
   responsive to determining that the current node is not contained within one of the control flows of the plurality of control flows within the extracted control flows data structure:
      applying the recursive trace algorithm to the input of the current node; and
      adding the current node to the traced data structure; and
   outputting the traced data structure, wherein the traced data structure is a list containing TensorFlow graph nodes and common intermediate representation control flow objects.

16. The method of claim 6, wherein the determining whether the corresponding TensorFlow graph loop predicate and bodies are valid comprises determining that the TensorFlow graph loop predicate and loop bodies satisfy following conditions:
   the TensorFlow graph loop does not include any Loop Condition nodes; and
   the TensorFlow graph loop does not include a Merge node of a TensorFlow graph branch.

17. A non-transitory computer-readable medium storing computer-readable instructions which, when executed by a processing system, cause the processing system to perform operations including:
   receiving a TensorFlow graph including one or more control flows;
   processing the TensorFlow graph to extract control flows from the TensorFlow graph and storing the control flows in an extracted control flows data structure;
   applying a recursive trace algorithm on outputs of the TensorFlow graph, the applying the recursive trace algorithm comprising recursively utilizing the extracted control flows data structure on the outputs of the TensorFlow graph to construct a common intermediate representation that expresses hierarchical control flows;
   removing all forwarding nodes contained within a TensorFlow graph loop predicate and loop bodies;
   for each respective nested common intermediate representation branch within the TensorFlow graph loop predicate and the loop bodies, responsive to determining that the respective nested common intermediate representation branch has an empty branch predicate:
      transferring all nodes within a common intermediate representation branch into TensorFlow graph loop or bodies containing a branch; and
      removing the common intermediate representation branch from the TensorFlow graph loop predicate or the loop bodies;
   storing a common intermediate representation loop corresponding to the TensorFlow graph loop in the extracted control flows data structure, wherein the common intermediate representation loop includes the TensorFlow graph loop predicate and the loop bodies; and
   constructing one or more compiler intermediate representations from the common intermediate representation.

18. The non-transitory computer-readable medium of claim 17, wherein the applying the recursive trace algorithm comprises:
   using an output of the TensorFlow graph as a current node;
   responsive to determining that the current node is not a terminal node and the current node is not a traversed node, adding the current node to a traversed data structure indicating that the current node has been traversed;
   responsive to determining that the current node is included within one of the control flows of a plurality of control flows within the extracted control flows data structure:
      applying the recursive trace algorithm to inputs of a control flow that contain the current node; and
      adding the control flow that contains the current node to a traced data structure;
   responsive to determining that the current node is not included within one of the control flows of the plurality of control flows within the extracted control flows data structure:
      applying the recursive trace algorithm to an input of the current node; and
      adding the current node to the traced data structure; and
   outputting the traced data structure, wherein the traced data structure is a list containing TensorFlow graph nodes and common intermediate representation control flow objects.

19. A processing system comprising:
a memory storing instructions; and
at least one processor in communication with the memory, the at least one processor configured, upon execution of the instructions, to perform the following steps:
  receiving a TensorFlow graph including one or more control flows;
  processing the TensorFlow graph to extract control flows from the TensorFlow graph and storing the control flows in an extracted control flows data structure;
  applying a recursive trace algorithm on outputs of the TensorFlow graph, the applying the recursive trace algorithm comprising: recursively utilizing the extracted control flows data structure, on the outputs of the TensorFlow graph, to construct a common intermediate representation that expresses hierarchical control flows;
  removing all forwarding nodes contained within a TensorFlow graph loop predicate and loop bodies;
  for each respective nested common intermediate representation branch within the TensorFlow graph loop predicate and the loop bodies, responsive to determining that the respective nested common intermediate representation branch has an empty branch predicate:
    transferring all nodes within a common intermediate representation branch into TensorFlow graph loop or bodies containing a branch; and
    removing the common intermediate representation branch from the TensorFlow graph loop predicate or the loop bodies;
  storing a common intermediate representation loop corresponding to the TensorFlow graph loop in the extracted control flows data structure, wherein the common intermediate representation loop includes the TensorFlow graph loop predicate and the loop bodies; and
  constructing one or more compiler intermediate representations from the common intermediate representation.

* * * * *